Patented May 4, 1943

2,318,391

UNITED STATES PATENT OFFICE 2,318,391

PROCESS FOR PREPARING CAMPHENE

Clyde O. Henke, Wilmington, and Gastao Etzel, Newark, Del., assignors to E. I. du Pont de Nemours & Company, Wilmington, Del., a corporation of Delaware No Drawing. Application May 23, 1941, Serial No. 394,802

12 Claims. (Cl. 260—666)

This invention relates to a process for preparing camphene from pinene and particularly to improvements in the process of our prior Patent No. 2,129,323.

Technical camphene, as ordinarily obtained by the isomerization of pinene followed by fractional distillation, is somewhat impure containing isomers and other impurities, which have about the same boiling point as camphene and hence are difficult to separate from the camphene by physical means. In our Patent No. 2,129,323 granted September 6, 1938, we have disclosed an improved method of preparing camphene from pinene. The camphene produced by such latter method is still impure and has a freezing point of about 36 to 38° C. It is important, particularly when the camphene is employed to produce camphor, that the camphene be as pure as possible.

It is an object of the present invention to provide a new and improved process of preparing camphene from pinene. Another object is to provide a method of isomerizing pinene to camphene with the production of a purer camphene of high freezing point. It is a particular object of the present invention to provide a process which will be an improvement upon the process in our prior Patent No. 2,129,323. A further object is to advance the art. Still other objects will appear hereinafter.

The above and other objects of our invention may be accomplished by heating freshly distilled pinene with vermiculite in the presence of a dihydric or trihydric phenol of the benzene, naphthalene or diphenyl series or decolorizing carbon, then separating the catalyst from the reaction products and then separating the camphene from the reaction products by fractional distillation, sweating or similar processes. We have found that, by such process, the impurities have higher boiling points than those obtained by the prior processes so that the camphene may be more readily separated therefrom in a purer state. The camphene, obtained by such process, will have a freezing point of from about 40° C. to about 48° C.

It is essential to this process that the pinene, which is heated with the vermiculite and the polyhydric phenol or the decolorizing carbon, be freshly distilled. By "freshly distilled," we mean that the pinene be distilled and then treated with the vermiculite before any substantial change can take place in the properties of the pinene. It will generally be desirable to start the isomerization of the pinene within 24 hours of the distillation. Preferably, the isomerization will be started as soon as possible after the distillation and within one hour thereof. The polyhydric phenols, employed in accordance with our invention, may be added to the pinene prior to or during the distillation or immediately upon completion of the distillation and, under such circumstances, the pinene may be allowed to stand for a somewhat longer period of time before starting the isomerization. Pure pinene or crude pinene, such as gum turpentine, wood turpentine or oils containing pinene, may be employed in the process.

The isomerization may be carried out as described in our prior Patent No. 2,129,323, but in the presence of certain polyhydric phenols or decolorizing carbon. The vermiculite employed may be expanded or unexpanded vermiculite of the character disclosed in Patent No. 2,129,323. The amount of vermiculite may vary from 0.5% to about 80% of the amount of the pinene used, but will preferably be employed in the proportion of from about 2% to about 20% of the amount of the pinene. The reaction may be carried out at temperatures of from 80° C. to 300° C. and preferably at about 100° C. to about 180° C. The reaction may be carried out at atmospheric pressures or under superatmospheric pressures.

The polyhydric phenols, employed in our process, are the di-hydroxy and tri-hydroxy substituted aromatic hydrocarbons of the benzene, naphthalene and diphenyl series in which the hydroxy groups are directly attached to different ring carbon atoms and are herein called dihydric and tri-hydric phenols of the benzene, naphthalene and diphenyl series, represented by dihydroxy benzenes, trihydroxy benzenes, dihydroxy naphthalenes, trihydroxy naphthalenes, dihydroxy diphenyls and trihydroxy diphenyls. They may contain alkyl substituents but no non-hydrocarbon substituents. Representative compounds are hydroquinone, pyrogallic acid, catechol, resorcinol, 1-6-dihydroxy naphthalene, 2-7-dihydroxy naphthalene, 1-5-dihydroxy naphthalene, 3-3'-dimethyl 4-4'-dihydroxy diphenyl, 4-4'-dihydroxy diphenyl and dicatechol boric acid. Preferably, we employ hydroquinone with the freshly distilled pinene and the vermiculite. The amount of the polyhydric phenol may be widely varied, but will preferably be in the proportion of from about 0.01% to about 5% of the amount of the pinene.

Similar results will be obtained by the use of decolorizing carbon in place of the polyhydric phenols. When decolorizing carbon is employed, it may be employed in the proportion of from about 0.5% to about 50% of the amount of the pinene. Preferably, the amount of decolorizing carbon will be about 2.5% of the weight of the pinene. Decolorizing carbons, which are suitable for our purpose, are those sold under the trade names "Nuchar," "Darco," "Carbrox" and "Norit."

In order to more clearly illustrate our invention, the preferred modes of carrying the same into effect and the advantageous results obtained thereby, the following examples are given:

EXAMPLE I

One hundred parts of freshly distilled pinene, 7.5 parts of vermiculite and 0.2 part of hydroquinone were charged into an iron vessel equipped with agitation and a reflux condenser. The mixture was heated at 160° C. for 10 hours. At the end of the 10 hour period, it was cooled and filtered. High freezing point camphene was separated from modified terpenes by fractional distillation. Fifty-two parts of camphene, freezing at 46° C., and 45 parts of modified terpenes were secured.

EXAMPLE II

To one hundred parts of pinene were added 0.2 part of hydroquinone and the mixture distilled. The hydroquinone distilled over with the pinene. Seven and one-half parts of crude vermiculite were added to the distillate and the mixture agitated at 160–165° C. for 10 hours. At the end of the 10 hour period, the mixture was cooled and filtered to remove the catalyst. The filtrate was then fractionally distilled. Two-tenths part of low boiling terpene, 53 parts of camphene, freezing at 47° C., and 44 parts of modified terpenes were secured.

EXAMPLE III

The process of Example I was repeated, employing various amounts of different polyhydric phenols and employing temperatures of 160–165° C. In each case, more than 40 parts of camphene were obtained by the fractional distillation. The polyhydric phenols employed, the amounts employed for 100 parts of the pinene and the freezing points of the camphene obtained are shown in the following Table I.

Table I

| Addition compounds | Parts | Freezing points |
|---|---|---|
| Hydroquinone | 0.02 | 43.5 |
| Hydroquinone | 0.2 | 47 |
| Pyrogallic acid | 0.02 | 40 |
| Catechol | 0.02 | 41.5 |
| Resorcinol | 0.2 | 41 |
| 1-6-dihydroxy naphthalene | 0.02 | 42 |
| 2-7-dihydroxy naphthalene | 0.02 | 41.5 |
| 1-5-dihydroxy naphthalene | 0.02 | 41.5 |
| 3-3'-dimethyl 4-4'-dihydroxy-diphenyl | 0.02 | 43 |
| 4-4'-dihydroxy-diphenyl | 0.1 | 39.5 |
| None | | 38.5 |
| Dicatechol boric acid | 0.1 | 43 |

EXAMPLE IV

One hundred parts of freshly distilled pinene, 7.5 parts of crude unexpanded vermiculite, and 2.5 parts of decolorizing carbon were agitated and heated at 160° C. for 10 hours. At the end of the 10 hour period, the mixture was cooled and filtered to remove the catalyst. Camphene was then separated from the distillate by fractional distillation. Fifty parts of camphene, freezing at 45° C., and 48 parts of modified terpenes were secured.

It will be understood that the preceding examples have been given for illustrative purposes only. Many variations and modifications, which can be made in our process and which come within the spirit of our invention, will be readily apparent to those skilled in the art. For example, the catalysts may be added gradually to the hot freshly distilled pinene, during the course of the reaction, or may be added to the cold freshly distilled pinene prior to the heating. The catalysts may be separated from the crude reaction products by filtration or by decanting off the oily layer. The camphene may be separated from the reaction mass by the well known sweating process, but is preferably separated by fractional distillation.

From all of the above, it will be apparent that we have provided a new and improved process for obtaining high freezing point camphene of high purity directly from pinene in a simple and efficient manner. Such camphene is particularly desirable for use in the manufacture of camphor of unusual purity and quality.

We claim:

1. The process of preparing camphene from pinene which comprises heating freshly distilled pinene with vermiculite in the presence of a member of the group consisting of dihydric and trihydric phenols of the benzene, naphthalene and diphenyl series.

2. The process of preparing camphene from pinene which comprises heating freshly distilled pinene with from 0.5% to 80% of vermiculite in the presence from about 0.01% to about 5% of a member of the group consisting of dihydric and trihydric phenols of the benzene, naphthalene and diphenyl series at from 80° C. to 300° C.

3. The process of preparing camphene from pinene which comprises heating freshly distilled pinene with vermiculite in the presence of hydroquinone.

4. The process of preparing camphene from pinene which comprises heating freshly distilled pinene with from 0.5% to 80% of vermiculite in the presence of from about 0.01% to about 5% of hydroquinone at from 80° C. to 300° C.

5. The process of preparing camphene from pinene which comprises heating freshly distilled pinene with from 0.5% to 80% of vermiculite in the presence of from about 0.01% to about 5% of hydroquinone at from about 100° C. to about 180° C.

6. The process of preparing camphene from pinene which comprises heating freshly distilled pinene with from about 2% to about 20% of vermiculite in the presence of from about 0.01% to about 5% of hydroquinone at from about 100° C. to about 180° C.

7. The process of preparing camphene from pinene which comprises heating freshly distilled pinene with about 7.5% of vermiculite in the presence of about 0.2% of hydroquinone at from about 160° C. to about 165° C.

8. The process of preparing camphene from pinene which comprises heating freshly distilled pinene with from 0.5% to 80% of vermiculite in the presence of from about 0.01% to about 5% of a dihydric phenol of the benzene series at from 80° C. to 300° C.

9. The process of preparing camphene from pinene which comprises heating freshly distilled pinene with from 0.5% to 80% of vermiculite in the presence of from about 0.01% to about 5% of a dihydric phenol of the naphthalene series at from 80° C. to 300° C.

10. The process of preparing camphene from pinene which comprises heating freshly distilled pinene with from 0.5% to 80% of vermiculite in the presence of from about 0.01% to about 5% of 1-6-dihydroxy naphthalene at from 80° C. to 300° C.

11. The process of preparing camphene from pinene which comprises heating freshly distilled pinene with from 0.5% to 80% of vermiculite in the presence of from about 0.01% to about 5% of a dihydric phenol of the diphenyl series at from 80° C. to 300° C.

12. The process of preparing camphene from pinene which comprises heating freshly distilled pinene with from 0.5% to 80% of vermiculite in the presence of from about 0.01% to about 5% of 3-3'-dimethyl 4-4'-dihydroxy-diphenyl at from 80° C. to 300° C.

CLYDE O. HENKE.
GASTAO ETZEL.